United States Patent [19]

Ellis

[11] 4,201,125

[45] May 6, 1980

[54] WOOD RESIN COOKING APPARATUS

[76] Inventor: Clarence E. Ellis, 724 Monument Rd., Ponca City, Okla. 74601

[21] Appl. No.: 1,215

[22] Filed: Jan. 5, 1979

[51] Int. Cl.² .......................... A23B 4/04; A47J 37/06
[52] U.S. Cl. ........................................ 99/446; 99/448; 99/482; 126/25 A
[58] Field of Search ................ 99/467, 446, 482, 448, 99/396, 331, 332, 333, 486; 126/25 R, 25 A

[56] References Cited

U.S. PATENT DOCUMENTS

| | | | |
|---|---|---|---|
| 2,262,910 | 11/1941 | Aller | 99/482 |
| 3,301,170 | 1/1967 | Beasley | 99/331 |
| 3,375,775 | 4/1968 | Folmar | 99/446 |
| 3,589,269 | 6/1971 | Weir | 99/332 |
| 3,699,876 | 10/1972 | Ellis | 99/396 |
| 3,841,211 | 10/1974 | Ellis | 126/25 R |
| 3,974,760 | 8/1976 | Ellis | 99/482 |

*Primary Examiner*—Billy J. Wilhite
*Attorney, Agent, or Firm*—Lawrence L. Colbert

[57] ABSTRACT

Plural heating elements for a corresponding number of self-adjusting smoldering wood supports are independently timed and thermostatically controlled to create a wider range of adjustability and versatility in the cooker to thus widen the variety of products which can be cooked as well as refining and rendering more sensitive the cooking procedures.

2 Claims, 2 Drawing Figures

WOOD RESIN COOKING APPARATUS

CROSS-REFERENCE TO RELATED APPLICATION

This application contains subject matter in common with prior copending application Ser. No. 970,107, filed Dec. 18, 1978, for SLOW COOKING APPARATUS.

BACKGROUND OF THE INVENTION

Slow cooking and smoking of many food items including wood resin cooking is rapidly becoming a revived art, leading to the necessity for more versatile and efficient cooking apparatuses of this type. The art in general has been stagnant in recent times, and only relatively crude traditional systems are available.

Thus, it is the main object of the invention to provide an improved apparatus for slow wood resin cooking which greatly enhances the utility and versatility of the system and renders it possible to achieve comparative highly refined control over the cooking and smoking of a variety of foods which require different degrees and different times of cooking and smoking for the most beneficial results. In short, the present invention seeks to eliminate "guesswork" and to greatly refine the control in a slow cooking apparatus for various meats, such as ham, bacon, fish and many other food items. The invention involves both accuracy and consistency in slow cooking and allows the operator to program a given set of conditions into the cooking apparatus, as will appear during the course of the following description.

Some fairly recent developments in the art constitute a background for the present invention including U.S. Pat. No. 3,974,760 on which the present invention is an improvement, and U.S. Pat. Nos. 3,699,876 and 3,841,211.

DETAILED DESCRIPTION

Figure 1:
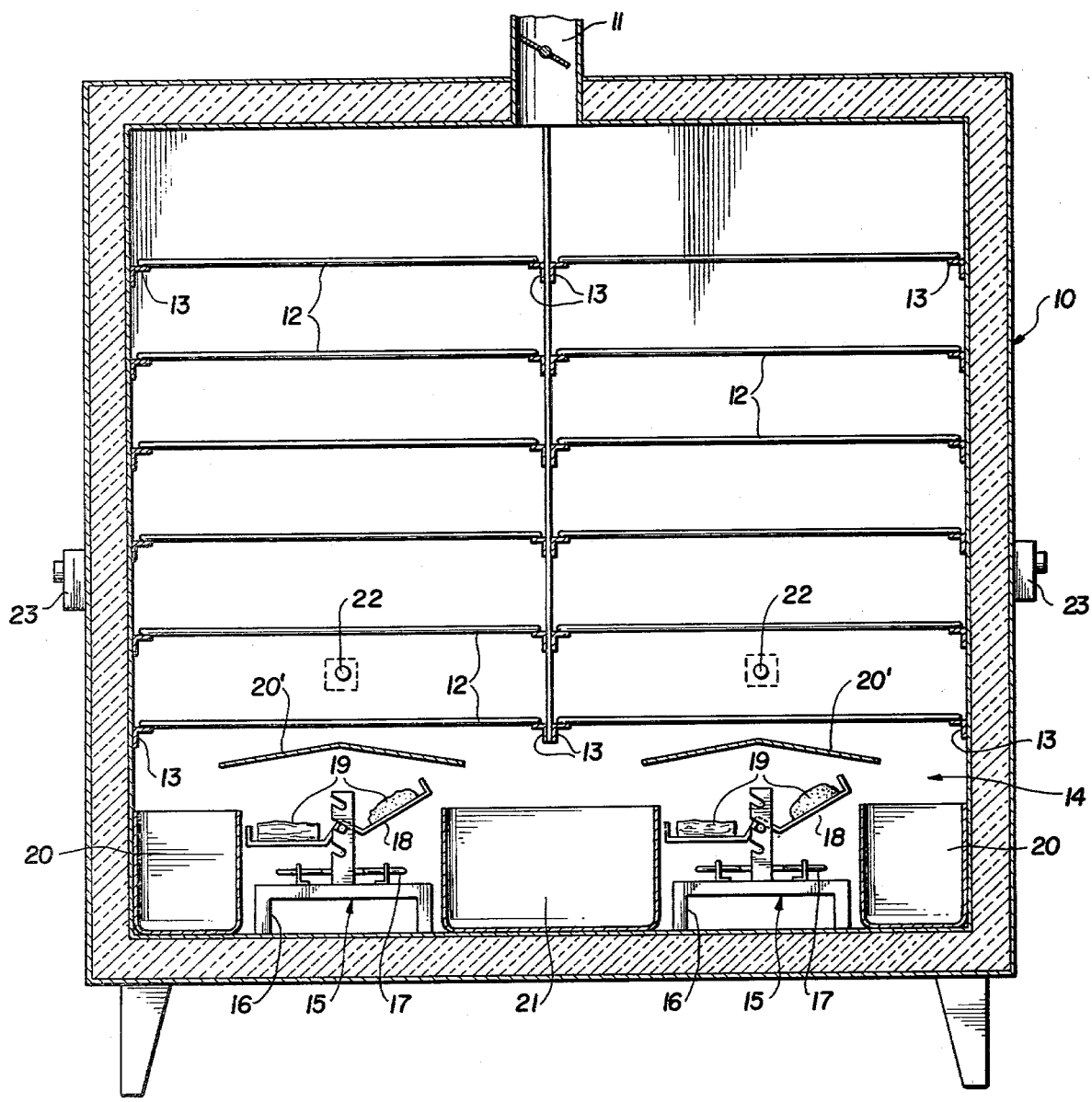
FIG. 1 is a front elevational view, partly in cross section, showing a wood resin slow cooking apparatus embodying the invention.

Referring to the drawings in detail, the numeral 10 designates an insulated oven housing having a suitable front insulated door, not shown. At its top, the oven 10 has an adjustable vent or stack 11 to regulate the upward escape of smoke in the desired manner.

Within the oven are plural tiers of food supporting racks 12 mounted on support rails 13 slidably, whereby the racks may be withdrawn forwardly through the front door of the oven at proper times. The racks occupy a major portion of the interior space of the oven 10, as shown, and as many as twelve or more racks 12 can be utilized depending upon the size of the apparatus, which can vary.

In a bottom chamber 14 of the oven below the lowermost rack 12 are a pair of laterally spaced wood burning assemblies 15 in accordance with the teachings of above-noted U.S. Pat. No. 3,974,760. Each assembly includes a support structure 16 resting on the bottom wall of the oven 10 and an associated electrical heating element 17 having a receptacle secured in the back wall of the oven. A vertically adjustable seesaw support 18 for smoldering wood fuel units 19 is included in each assembly 15 exactly as described in the last-mentioned patent.

As described in the referenced pending application, Ser. No. 970,107, a pair of deflectors 20' for meat juices and grease drippings is mounted over the assemblies 15 to shield them from such drippings. Removable drippings catch pans 20 and 21 are placed on the bottom wall of the oven 10 between the assemblies 15 and outwardly of the assemblies to receive the drippings running off of the two deflectors 20', for the reasons explained in said pending application. The drippings captured in the pans 20 and 21 are at a comparatively cool zone in the oven which prevents ignition of the drippings and the formation of objectionable fumes.

Figure 2:
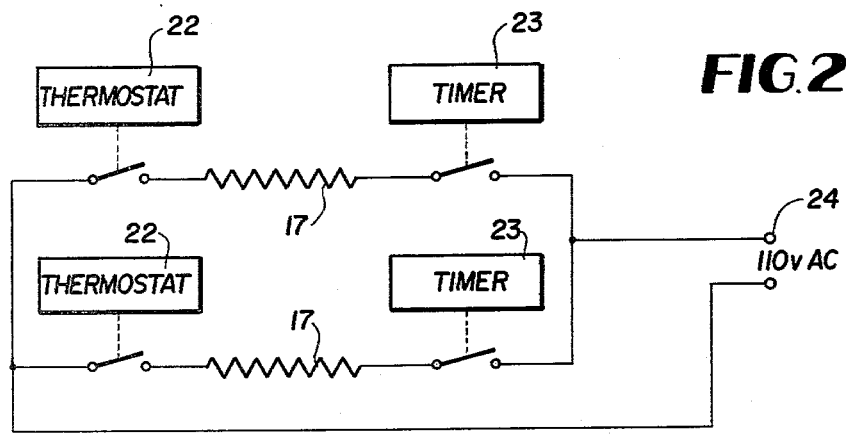
FIG. 2 is a wiring schematic showing the heating element controls of the invention.

In the present invention, each separate heating element 17 is equipped with a thermostat switch 22, preferably on the back wall of the oven 10, and is also equipped with a timer switch 23, preferably on the side walls of the oven. As shown in FIG. 2, the two heating elements 17 and their thermostat and timer switches are electrically connected in parallel with a power source 24. The arrangement is such that the timer 23 for each heating element 17 is individually adjustable to cut in or cut out one element at a desired time, and each thermostat 22 can also be set to cut in or cut out an element 17 at a predetermined heat. More than two of the heating assemblies 15 can be incorporated in the apparatus, if desired. It should be evident that the use of two or more heating elements and associated seesaw fuel supports 18 renders the apparatus highly versatile and imparts thereto a fine degree of control. The use of separate heating elements with independent timers and thermostats is not merely to increase the cooking capacity of the apparatus but rather is to achieve a much wider and much more sensitive range of control over the slow cooking and smoking process than has heretofore been possible in the art.

Some definite advantages of the invention include the following:

(1) Safety. If an element 17 should fail when no operator is present, the oven will continue to operate on the other heating element or elements. This is important because much of the slow cooking process takes place at night without supervision.

(2) Variation of smoke application. By setting one element 17 to drop out before the other, heavy initial smoking followed by lighter smoking can be achieved. This is very desirable on some food products.

(3) Staging of heat. Some products require higher initial heat and lower finishing heat. With the invention, this can be accomplished by regulating one timer so that it will cut out the higher heat element 17 at a certain time, allowing the lower heat element to complete the cooking.

(4) Greater utility. The oven will operate (somewhat more slowly) on one burner; thus, in remote locations where spare parts are not quickly available, the apparatus can still be operated satisfactorily for a time.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A slow cooking apparatus comprising an upright housing having a top vent, vertically spaced superposed food racks supported within the housing in two side-by-side rows across the housing horizontally, a pair of laterally spaced heating elements and associated supports for slow burning fuel elements within the housing near the bottom wall thereof and below the two rows of food racks and being centered relative to the two rows laterally, a thermostat switch and a timer switch for each heating element on the housing, each heating element being serially coupled between its individual thermostat switch and timer switch, and each heating element and its serially coupled thermostat and timer switches being coupled in parallel with the other heating element and its thermostat and timer switches, and means for connecting the parallel coupled heating elements and thermostat and timer switches to a source of electrical power.

2. A slow cooking apparatus as defined in claim 1, and a food drippings deflector in the housing below each row of food racks and above each heating element and associated fuel support, and drippings catch pans below and on opposite sides of the deflectors and on opposite sides of said heating elements and associated fuel supports.

* * * * *